United States Patent [19]

Cox

[11] Patent Number: 5,249,570

[45] Date of Patent: Oct. 5, 1993

[54] EQUINE/CANINE HEMOGLOBIN-OXYGEN TRAINING MASK

[76] Inventor: Frederick L. Cox, 19396 Gunn Hwy., Odessa, Fla. 33556

[21] Appl. No.: 783,318

[22] Filed: Oct. 28, 1991

[51] Int. Cl.$^5$ .................. A62B 18/02; A61M 16/00; F16K 11/00; G05D 11/02

[52] U.S. Cl. .................. 128/206.28; 128/203.25; 128/205.11; 128/205.22; 128/914

[58] Field of Search .......... 128/200.24, 203.12, 128/203.29, 203.18, 204.11, 204.12, 204.18, 205.11, 205.25, 206.24, 206.27, 206.28, 914, 203.25, 205.22; 482/13; 119/130–132, 67; 54/80.3, 80.5

[56] References Cited

U.S. PATENT DOCUMENTS

| | | | |
|---|---|---|---|
| 405,883 | 6/1889 | Gard | 128/203.25 |
| 2,007,330 | 7/1935 | Hicks | 128/203.28 |
| 2,312,714 | 3/1943 | Herbin . | |
| 2,843,119 | 7/1958 | Glasser . | |
| 3,990,401 | 11/1976 | Langguth | 119/129 |
| 4,141,199 | 2/1974 | Doino, Jr. | 119/129 |
| 4,273,119 | 6/1981 | Marchello | 119/129 |
| 4,601,465 | 7/1986 | Roy | 128/207.16 |
| 4,634,117 | 1/1987 | Kramer | 128/914 |
| 4,726,174 | 2/1988 | Wilson | 128/207.11 |
| 4,809,692 | 3/1989 | Nowacki et al. | 128/203.29 |

FOREIGN PATENT DOCUMENTS 0083847  7/1983  European Pat. Off. ........ 128/206.21

OTHER PUBLICATIONS

"Ventilatory Muscle Strength and Endurance Training", Leith et al., Jnl of Apld. Physiology, vol. 4, No. 4, pp. 508–516, Dec. 1976.

Primary Examiner—Edgar S. Burr
Assistant Examiner—Kimberly L. Asher
Attorney, Agent, or Firm—Dominik, Stein, Saccocio, Reese, Colitz & VandDerWall

[57] ABSTRACT

A breathing method and apparatus adapted for use on an animal comprising a generally cylindrically shaped device having one open end and one closed end; padding secured to the device within the circumference of the open end adapted to accept and contact the muzzle of the animal; ports formed in the periphery of the device for the passage of air therethrough; tubes removably secured to the ports to allow for greater or lesser breathing enhancement as a function of the size of the tubes.

3 Claims, 6 Drawing Sheets

EQUINE/CANINE HEMOGLOBIN-OXYGEN TRAINING MASK

BACKGROUND OF THE INVENTION

1. Field of the Invention

This invention relates to a breathing modifier and, more particularly, to an improved breathing method and apparatus adapted for use on a competitor such as a horse or a dog to improve its oxygen transport and utilization for improved competitive performance.

2. Description of the Background Art

Animals, including humans, require oxygen to perform competitive activities. To achieve superior levels of competitive performance, lung capacity and efficiency must be developed to their fullest potential to facilitate efficient oxygen absorption into the blood stream.

In the field of competitive training, it has been theorized that if a horse or dog or other animal, including a human, is forced to train with a device on its face which forces re-breathing of oxygen-depleted, exhaled air, the lungs and the respiratory and circulatory systems will be strengthened. The strengthening is effected by the excess work the animal must do when inhaling in order to acquire adequate oxygen during exercise. By re-breathing exhaled air, either at rest or during exercise, the animal will compensate for the reduced oxygen supply by developing increased lung volume and by growing more and larger lung air cells. The animal will also develop improved cardiovascular functions such as increased blood volume, raised heart stroke-volume, and increased capillary bed in the stressed muscle tissue. More red blood cells with greater oxygen carrying capabilities and physiological improvements also result from the animal re-breathing exhaled air.

The result of all these factors is an improvement in, and prolonging of, optimal oxygen transportation to the muscle cells. Improved oxygen transportation delays and minimizes the onset of anaerobic muscle metabolism and the concomitant production of lactic acid. The effect is to reduce pain and fatigue.

Furthermore, a horse or a dog that is trained while fitted with a breathing modifier that forces the horse to re-breathe exhaled air will run faster and longer when not fitted with the breathing modifier. The horse or dog realizes the full benefit of improved respiratory and circulatory performance that resulted from the training with the breathing modifier when the breathing modifier is removed.

The present invention is directed to improving known devices which improve competitive performance by forcing the re-breathing of exhaled air in a manner which is safe, secure, convenient, economical and adaptable to different capabilities of various horses.

The prior art discloses several methods of forcing the re-breathing of exhaled air. By way of example, U.S. Pat. Nos. 4,273,119 to Marchello and 4,141,199 to Doino, Jr. disclose masks for horses. These devices are specially designed as breath protectors and facilitate the breathing of pure warm air by the horse. The Marchello device is formed of a thick, open celled, foamed plastic material. The foam employed in the device has cells that allow air to pas freely through the device but screen dust and dirt carried in the air. The dome shaped device does not impede the flow of fresh air to the horse, rather the device freely passes fresh air to the horse. In Doino, Jr. a dome shaped breath protector for a horse is formed by a self supporting cover over the muzzle of a horse which can be released by the driver of the horse. The release of the protector is effected by a cable extending from the driver forward to a latching plate with a transverse slot which is incorporated in a cover and a latch which engages in the slot and is mounted on the head of the horse. In both Marchello and Doino, Jr. a dome shaped breath protector is employed that allows clean, warm air to pass through the device minimizing the amount of re-breathed air that the horse inhales.

U.S. Pat. No. 4,726,174 to Wilson consists of a dog filtration mask. The mask is constructed of a crown band to which is attached an air filtration means and a collar for the dog's neck. The mask extends from the dog's nose up and over the dog's eyes and ears. The device provides a visor over the dog's eyes to allow for unimpaired vision and filtration paper for the dog to breath clean filtered air through. The device's filtration paper forms a flat panel that allows the dog to breath clean air during grooming without forcing the dog to re-breath his exhaled air.

Methods to limit human re-breathing of exhaled air are shown in U.S. Pat. Nos. 4,601,465 to Roy; 2,007,330 to Hicks; and 405,883 to Gard. In Roy, the device comprises a mouth piece for insertion in the mouth of the user of the device or a mask that attaches to the face of the user of the device. The mask is shaped to cover the human mouth and nose and has one central hole through which the user may breath. The device stimulates the human respiratory system by making breathing more difficult and limiting the amount of air inhaled into the user's lungs. The device operates without requiring the user to re-breath any exhaled air. In Hicks, a device employs a mask which conforms to the proportions of a human face and completely encloses the nose and mouth of a human user. The device has an expandable bladder that is connected to the mask via a flexible tube. The device compels the user to re-breath his exhaled air without any provision for introducing fresh air to the user. In Gard, a human vapor bath for the face allows a user to either inhale the contents of a closed bath or to breath fresh air through tubes passing though the walls of the vapor bath device. The vapor bath device is essentially a pan which is shaped in plan to conform to the human face and may or may not use padding along the edges of the pan. Furthermore, in U.S. Pat. No. 4,809,692 to Nowacki et al, an inhalation valve is used in combination with a molded rubber or plastic adapter or a face mask that fits over the nose and mouth of a baby or small child. The device incorporates a one way valve to allow air and medication to flow into the child who is receiving air and medication but prevents outward flow from the child.

Lastly, a marine mammal vacuum recovery system is shown in U.S. Pat. No. 3,990,401 to Langguth. This device allows a marine mammal to be fitted with a nose cup that enables the mammal to carry a underwater vacuum tool in a forward facing direction. The device has no provisions to affect the re-breathing of exhaled air by the mammal.

None of these prior art patents teaches or suggests the safe, secure, convenient, economical, and adaptable way of forcing an animal to re-breath exhaled air as described herein in order to improve competitive performance. Known devices are simply lacking in one regard or another.

As illustrated by the prior art patents, and known commercial devices, efforts are continuously being made to improve breathing modifiers. None of the prior art efforts, however, suggest inventive combination of component elements arranged and configured as disclosed and claimed herein. Prior efforts do not provide the benefits attendant with the present invention. The present invention achieves its purposes, objectives and advantages over the prior art devices through a new, useful and unobvious combination of method steps and component elements, through of a minimum number of functioning parts, at a reduction in cost to the manufacturer, and through the utilization of only readily available materials and conventional components.

Therefore, it is an object of this invention to provide an improved breathing method and apparatus adapted for use on an animal comprising a generally cylindrically shaped device having one open end and one closed end; padding secured to the device within the circumference of the open end adapted to accept and contact the muzzle of the animal; port means formed in the periphery of the device for the passage of air therethrough; and tube means removably secured to the port means to allow for greater or lesser breathing modification as a function of the size of the tube means.

Another object of this invention is to accommodate the exercising of different capacity horses or dogs by using tubes of varying length attached to threaded ports on the periphery of the breathing modifier.

A further object of this invention is to develop more lung volume in a horse or dog by growing more and larger lung cells.

A further object of this invention is to improve a horse's or dog's cardiovascular functions of increased blood volume, raised heart volume, and increased capillary bed in the stressed muscle tissue.

A further object of this invention is to produce more red blood cells and greater oxygen carrying capability in an animal.

A further object of this invention is to improve and prolong optimal oxygen transport to the muscle cells and thereby delay and minimize the onset of anaerobic muscle metabolism along with the concomitant production of lactic acid and accompanying pain and fatigue.

A further object of this invention is the training of competitors fitted with the breathing modifier for allowing them to run faster and farther than when not wearing the breathing modifier.

The foregoing has outlined some of the more pertinent objects of the invention. These objects should be construed as merely illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the spirit and scope of the invention as defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved breathing method and apparatus which includes a breathing modifier adapted for use on an animal comprising a generally cylindrically shaped device having one open end and one closed end; padding secured to the device within the circumference of the open end adapted to accept and contact the muzzle of the animal; port means formed in the periphery of the device for the passage of air therethrough; and tube means removably secured to the port means to allow for greater or lesser breathing modification as a function of the size of the tube means.

The device is constructed of a elastomeric compound to form an essentially rigid, truncated conical shape proportioned so that the shape generally conforms to the dimensions of an animal's head to allow between about 1 to 3 inches of clearance between the closed end of the device and the animal's head through the majority of its extent. The padding within the perimeter of its opening is a thick, closed cell, elastomeric material between about 1 to 2 inches thick. The port means and tube means are both threaded for mutual coupling. The apparatus further includes a group of tube means of varying size, any of which may be coupled to the port means. The apparatus further includes a fastening means for securing the device to the head of an animal, the fastening means formed as flat loops formed onto the exterior surface of the device. The length of the device is about $1\frac{1}{2}$ to 2 times the average diameter of the device or about 2 to 3 times the average diameter of the device. The apparatus includes gas tank means positionable to be supported by the animal with the tube means coupling the port means to the tanks for supplementing the re-breathed air with gas from the gas tank means.

The invention may also be incorporated into a breathing modifier adapted for use on a horse for increasing competitive performance comprising a truncated conical shaped device having one larger open end and one smaller closed end constructed of a elastomeric compound, the length being between about 2 and 3 times the average diameter of the device, allowing between about 1 to 3 inches of clearance between the closed end of the device and the horse's head; foam padding within the perimeter of the open end, the padding being a thick, closed cell, elastomeric material and between about 1 to 2 inches thick secured to the device within the circumference of its open end adapted to accept and contact the muzzle of the horse; two ports located on the periphery of the device for the passage of air therethrough; tubes removably secured to the ports to allow for greater or lesser breathing modification as a function of the length of the tubes; and fastening means attached to the exterior surface of the device for securing the device to the head of a horse.

This invention may also be incorporated into a method of training an animal while modifying its breathing capabilities for enhancing competitive activities comprising the steps of: (a) determining the lung capacity of the animal to be trained; (b) determining the percentage of oxygen and rebreathed air intake which would be required to force increased work by the lungs of the animal during training in order to effect the intended increase in breathing capabilities and, consequently, improved competitive performance; (c) selecting proper equipment in order to effect the determined extent of oxygen and rebreathed air intake for forcing increased work by the animal in training; (d) establishing a training regimen in accordance with previously determined lung capacity and oxygen and rebreathed air intake required; (e) monitoring the animal periodically during training; (f) testing the animal without the apparatus to determine training progress; and (g) modifying the oxygen and rebreathed air intake and level of training strenuousness as a result of such testing.

Lastly, the invention may also be incorporated into a method of training an animal while modifying its breathing capabilities for enhancing competitive activities comprising the steps of determining the lung capacity of the animal to be trained; determining the percentage of re-breathed air which would be required to force increased work by the lungs of the animal during training in order to effect the intended increase in breathing capabilities and, consequently, improved competitive performance; selecting a properly sized breathing inhibiter in order to effect the determined extent of re-breathing for forcing increased work by the animal in training; establishing a training regimen in accordance with previously determined percentage of lung capacity and re-breathed air required; monitoring the animal periodically during training; testing the animal without the inhibitor to determine training progress; and modifying the inhibitor and level of training strenuousness as a result of such testing.

The breathing inhibiter may be tubing, the length of which determines the percentage of re-breathed air. The breathing inhibiter may be tubing coupled to a tank with modified air, the extent of tank opening determining the percentage of oxygen in the re-breathed air.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed herein may be readily utilized as a basis for modifying or designing the other methods and constructions for carrying out the same purposes of the present invention. It should also be realized by those skilled in the art that such equivalent methods and constructions do not depart from the spirit and scope of the invention as set forth in the appended claims.

BRIEF DESCRIPTION OF THE DRAWINGS

For a more complete understanding of the nature object and advantages of the present invention, reference should be had to the following detailed description taken in conjunction with the accompanying drawings in which.

Similar reference characters refer to similar parts throughout the several drawings.

DETAILED DESCRIPTION OF THE INVENTION

Shown in FIGS. 1 through 8 are various views of the primary embodiment of the breathing modifier apparatus 10 constructed in accordance with the principles of the present invention.

The breathing modifier 10 is adapted for use on a horse 12. The breathing modifier may be readily adapted for use on a dog or other competitor including a human, or any other animal whose competitive performance one wishes to improve. The modifier 10 includes a generally cylindrically shaped device, a mask or housing 16 that is formed with one open end 18 and one closed end 20. To accept and contact the muzzle 24 of a horse 12, padding 26 is attached to the housing along the inside circumference of the open end 18 of the housing 16. Along the periphery of the housing 16 there are two ports 30 attached for the passage of air therethrough. To the ports 30 variable length tubes 32 can be attached in a manner to be easily added and removed. The quantity of air that is re-breathed is a function of the size of the tubes 32 attached to the housing.

The housing 10 is preferably made of a one piece construction. The material is relatively hard and rigid but slightly flexible such as an elastomeric compound. The material is formed into an essentially rigid shape of truncated cone, frustro-conical, that is proportioned so that the housing 16 generally conforms to the dimensions of a horse's head. The housing 16 is sized to provide clearance between the closed end 20 of the housing 16 and the horse's mouth and between the horse's head through the majority of the extent of the housing 16. The closed end 20 of the housing 16 is round in shape and has a diameter slightly smaller than the diameter of the open end 18 which is also round, forming a truncated conical shape that has a length which is about 1½ to 2 times the average diameter of the housing. With this arrangement, a horse may be fitted with the breathing modifier 10 in such a manner that allows a snug fit between the open end 18 of the housing 16 and the horse's muzzle 24 to facilitate sealing the housing to the horse's muzzle. This arrangement further provides clearance of between about 2 to 6 inches between the housing 16 and the horse's muzzle along the closed end 20 of the housing and about 1 to 3 inches along the majority of the extent of the housing 16 to provide room for air circulation between the housing 16 and the horse's muzzle 24 to facilitate breathing by the horse 12.

The housing 16 has a thick, closed cell, elastomeric padding 26 functioning as a seal located continuously along the inside circumference of the open end of the housing. This material is of a sufficient thickness to form a seal between the open end 18 of the housing 16 and a horse's muzzle 24. In the preferred embodiment, the padding 26 is 1 to 2 inches thick. Furthermore, the padding is of a nature that will not allow fresh air to enter the housing through any gaps that might otherwise exist between the horses muzzle and the housing. The padding 26 will not absorb moisture because it is of an closed cell nature, but the padding 26 will create an air tight seal between the housing and the horse's muzzle which forces the horse to breath only air that is supplied through the breathing modifier device. The padding 26 has the further effect of securing and stabilizing the breathing modifier housing 16 to the horse. The padding acts as a means of prohibiting the housing from being pulled up onto the horse's muzzle. The padding 26 also stabilizes the movement of the housing along the horse's muzzle 24, preventing the closed end 20 of the housing 16 from contacting the horse's mouth as well as preventing the housing's open end 18 from covering the horse's eyes.

The two ports 30 located on the periphery of the housing 16 have tubes 32 connected to them. To allow releasable attachment of the tubes to the ports, both the ports and tubes are formed with threads 36. The threaded ports 30 provide a means of attaching threaded tubes 32 to the housing in a manner that allows quick, secure and simple exchange of the tubes 32 while the housing 16 is attached to a horse 12. The ports 32 are for the passage of air through the housing 16 to the horse for breathing. Furthermore, the ports 30 are the means of providing oxygen rich ambient air to a horse that is fitted with the breathing modifier 10.

Figure 1:
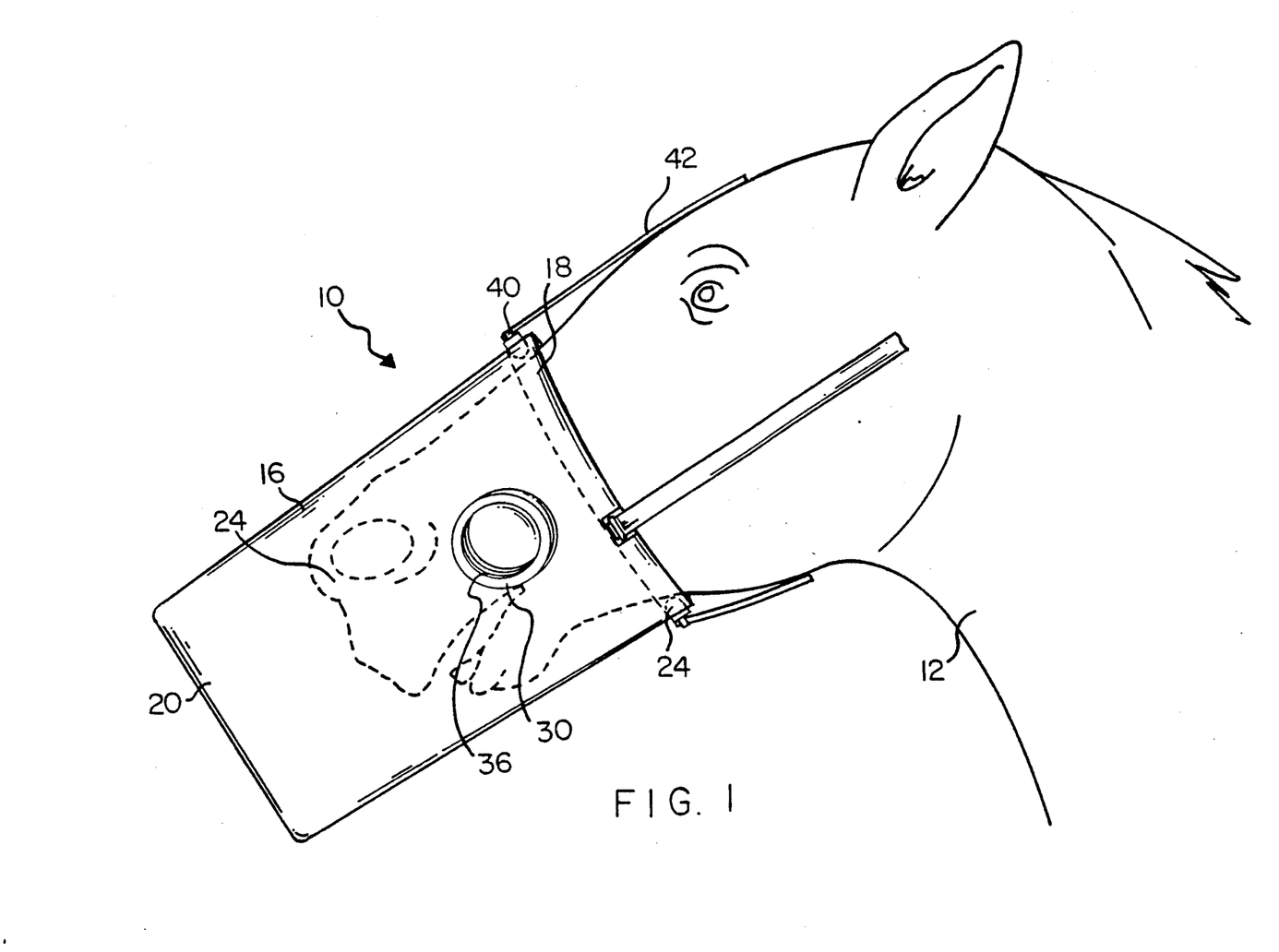
FIG. 1 is a perspective view of the present invention showing a horse wearing the breathing modifier device.
Figure 2:
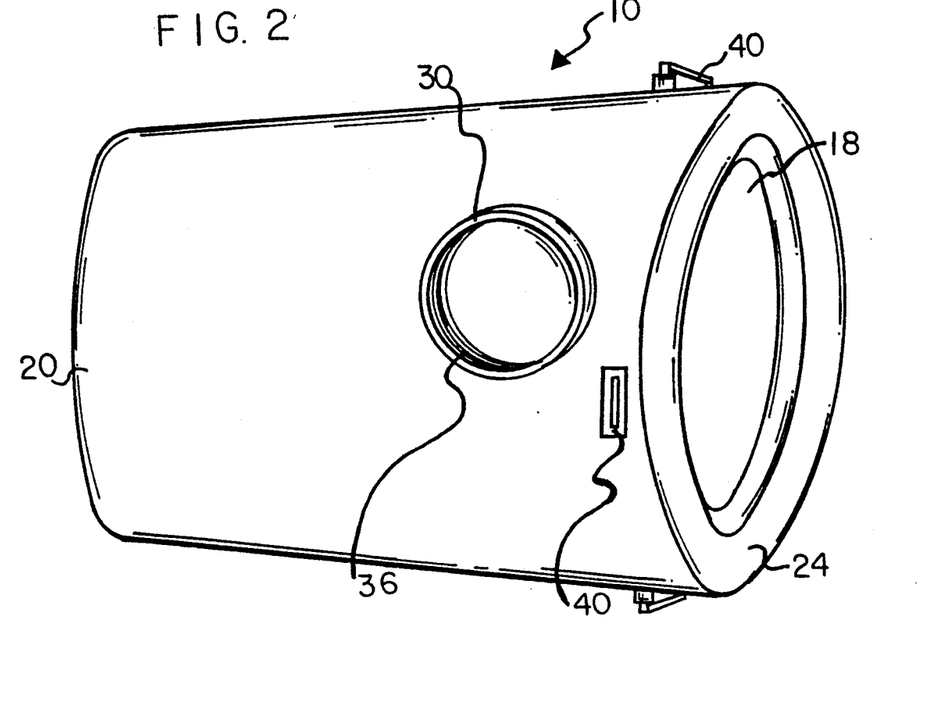
FIG. 2 is a left side elevational view of the breathing modifier device shown in FIG. 1.
Figure 3:
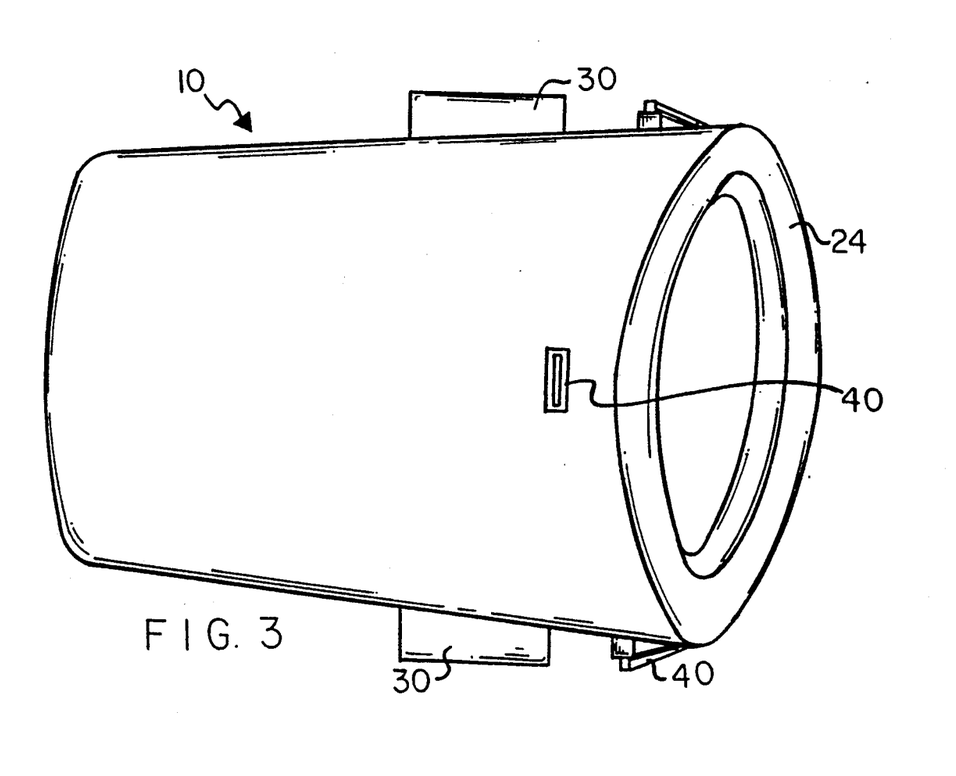
FIG. 3 is a top plan view of the breathing modifier device shown in FIG. 1.
Figure 4:
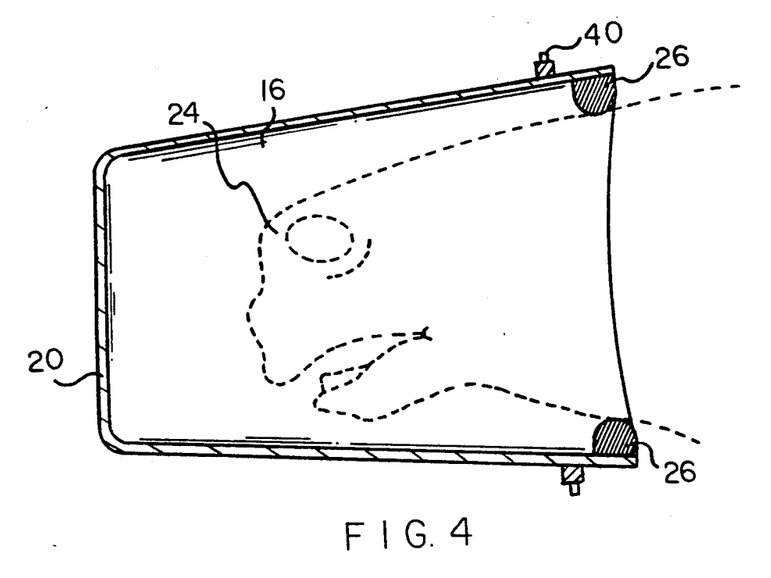
FIG. 4 is a longitudinal sectional view showing a horse's head fitted with the breathing modifier device shown in FIG. 1.
Figure 5:
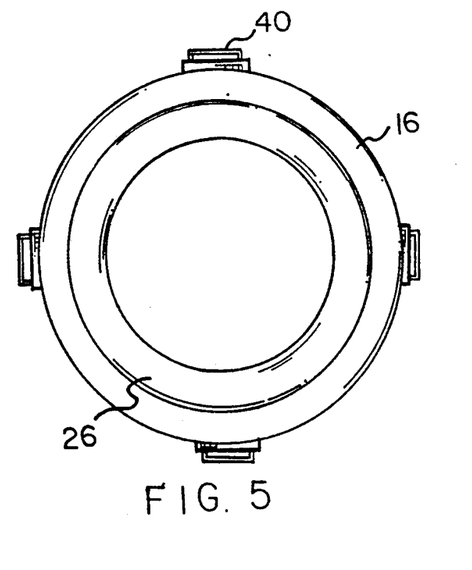
FIG. 5 is a rear end view of the breathing modifier device shown in FIG. 1.
Figure 6:
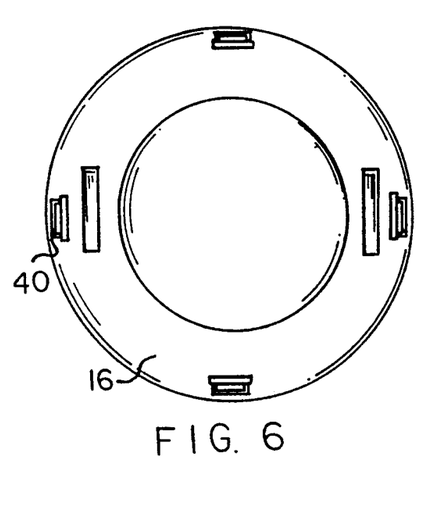
FIG. 6 is a forward end view of the breathing modifier device shown in FIG. 1.
Figure 7:
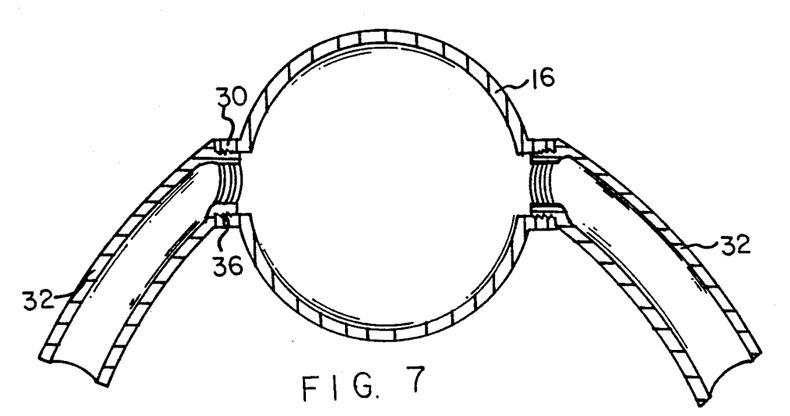
FIG. 7 is a cross sectional view of the breathing modifier device showing tubes attached to the device shown in FIG. 1.

The threaded ports 30 located on the housing attach to pairs from a group of tubes 32 which are of varying length. The tubes 32 of any pair are of the same size and may be interchangeable. The average tube is about 4 inches in internal diameter and about 6 inches in length, providing a reduced percentage of oxygen in the rebreathed air to a horse fitted with the breathing modifier 10. Any one of a number of the tube pairs may be coupled to the ports by using the mutually threaded ports. The tubes introduce air through the ports into the breathing modifier housing 16 for the horse to breath. The amount of fresh air a horse can inhale is a function of the horse's size and physical condition. Longer tubes as shown in FIG. 7 fitted to the breathing modifier housing 16 require a horse fitted with the housing to re-breathe a higher percentage of exhaled air than do shorter tubes. The effect of longer tubes may also be attained by a plurality of shorter tubes coupled together along their lengths. Note FIG. 8.

Figure 8:
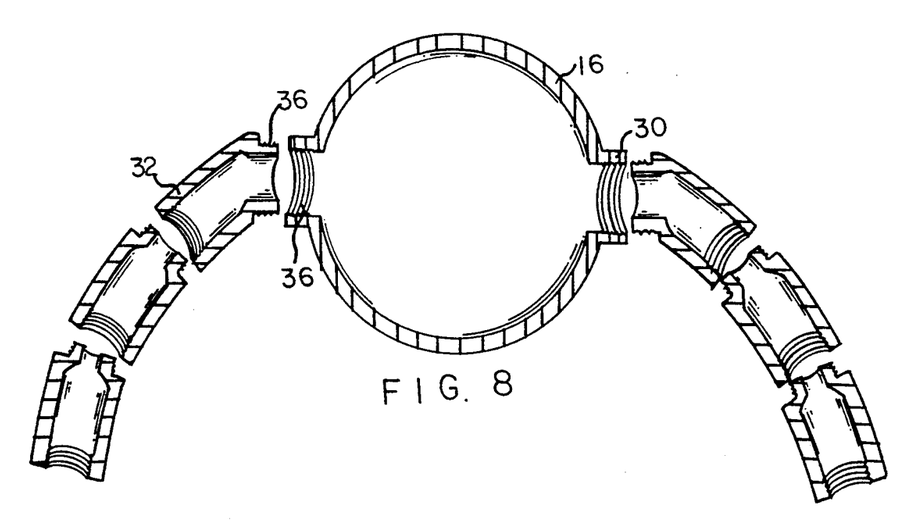
FIG. 8 is a cross sectional view of the breathing modifier device showing tubes detached from the device shown in FIG. 1.

A strong healthy horse can inhale and exhale with more force than a smaller or weaker horse can. Therefore, a strong horse fitted with the breathing modifier housing can be fitted with a pair of long tubes, or long series of short tubes, to force the horse to re-breath a desired quantity of exhaled air. Typically a large horse fitted with a pair of tubes of 4 inches internal diameter and 18 or 24 inches in length will re-breathe a greater percentage of its exhaled air. A smaller or weaker horse can be fitted with the same breathing modifier housing with a shorter pair of tubes attached to the housing's ports to provide a suitable amount of re-breathed air for the smaller weaker horse. Typically a small horse would be fitted with a pair, each tubes of 4 inches in internal diameter and 6 or 12 inches in length for re-breathing a lesser percentage of its exhaled air. As a result, a horse fitted with the housing during a training session can be forced to re-breathe various amount of its exhaled air by fitting various length tube pairs to the threaded ports of the housing without removing the housing from the horse.

The housing 16 further includes a fastening means 40 for securing the breathing modifier 10 to the head of a horse 12. The fastening means are formed as flat loops 40 secured onto the exterior surface of the housing 16. These flat loops 40 are of a size and shape that readily accept bridle straps 42. When the breathing modifier 10 is fitted to a horse's head, the flat loops 40 are located in such a manner that facilitates the use of bridle straps 42 that run from the flat loops rearward, behind a the head of a horse fitted with the breathing modifier. The flat loops 40 permit the bridle straps to pull the breathing modifier housing 16 firmly up onto the horse's muzzle 24. The upward movement of the housing 16 along the horse's muzzle 24 is stopped by contact between the horse's muzzle 24 and padding 26 located within the circumference of the housing's open end 18.

Figure 9:
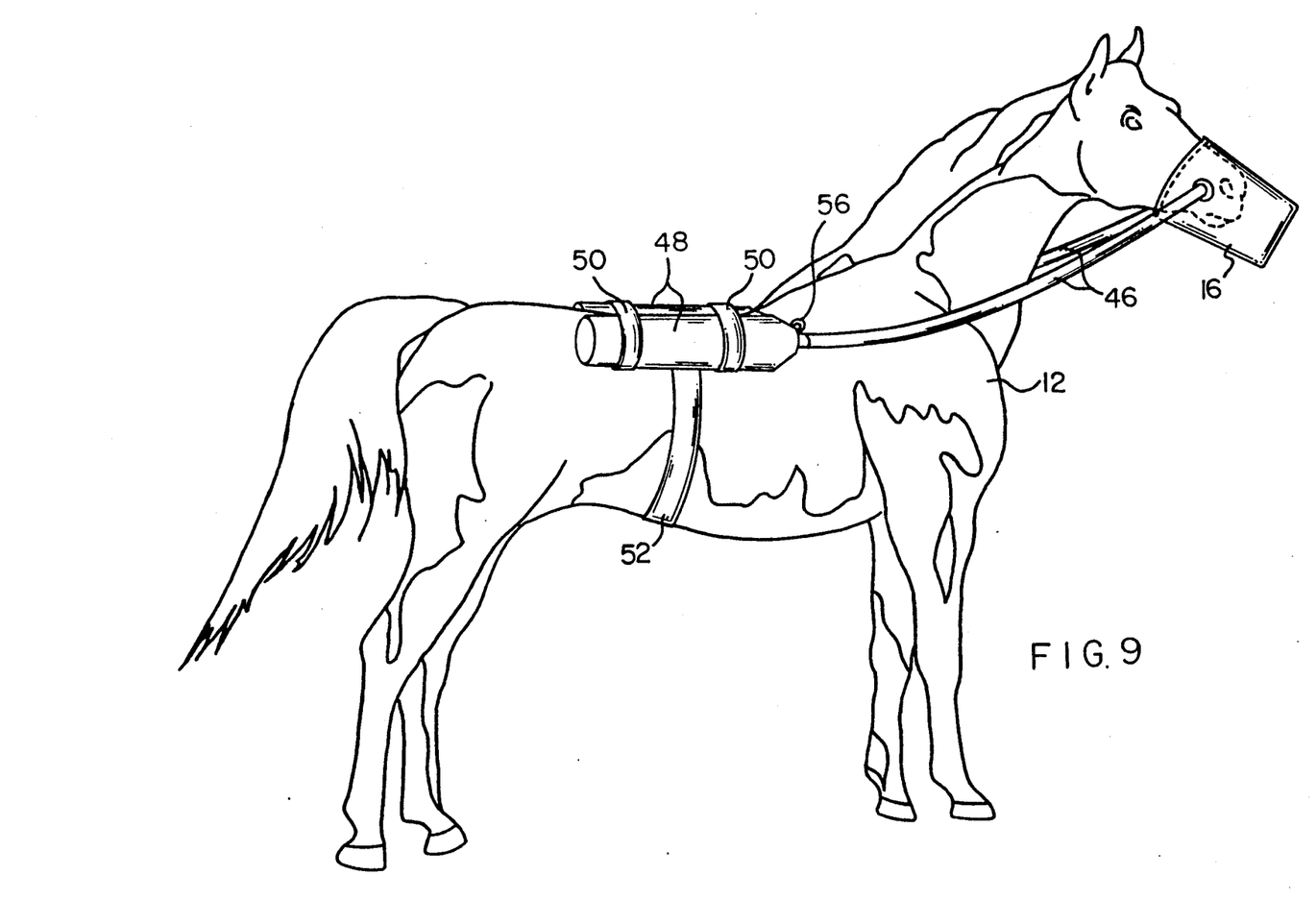
FIG. 9 shows an alternate embodiment of the invention with the tubes attached to an air substitute for breathing.
Figure 10:
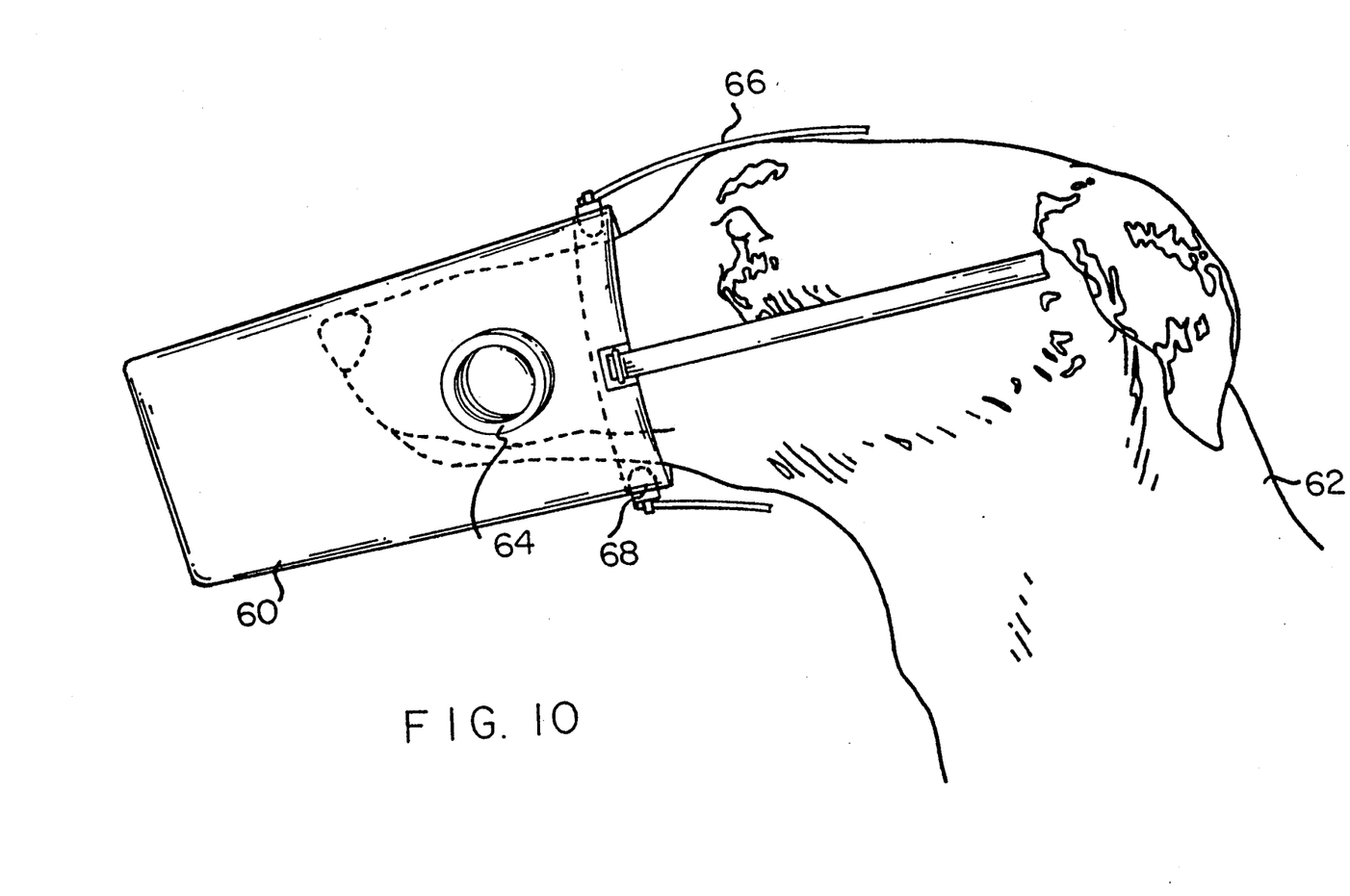
FIG. 10 shows another alternate embodiment of the invention modified for use on a dog.

Shown in FIGS. 9 and 10 are alternate embodiments of the invention. The alternate embodiment of FIG. 9 illustrates a housing 16 constructed in accordance with the principles of the present invention but with the tubes 46 being elongated and extending from the housing 16, to which they threadedly couple rearwardly to a greater extent than in the prior embodiment. In this alternate embodiment, a pair of gas tanks 48 filled with gas are supported on the back of the horse 12 or close to the horse on a tread mill. The tanks 48 are supported in a saddle bag-like arrangement 50, one on each side of the horse 12. Straps 52 are positioned over and under the horse to hold the tanks 48 in proper orientation for weight distribution during operation and use. The ends of the tubes 46 remote from the housing 16 are threadedly coupled with the tanks 48. The tanks 48 are also provided with valves 56 to vary the output of the tanks 48 to the housing 16 and to the horse for breathing. The tanks are preferably filled with a gas such as a nitrogen enriched air. Air normally has about 80% nitrogen and about 20% oxygen. The gas of the present invention increases the nitrogen to about 81 to 85% nitrogen with a corresponding decrease in oxygen. The purpose of the nitrogen rich air is to reduce the horse's intake of re-breathed carbon dioxide which might otherwise have a detrimental effect upon the horse after prolonged breathing. The use of the nitrogen enriched air to supplement the re-breathed air abates the problem created by the horse breathing its own exhaled carbon dioxide. This embodiment is particularly well suited for use with animals on treadmills.

The final embodiment is that shown in FIG. 10. In the FIG. 10 embodiment, the entire system is essentially the same as in the primary embodiment. The shape of the housing 60, however, is modified to fit the muzzle of a dog 62 who performs in competition, as for example, a greyhound. The housing 60 includes side ports 64 for the receipt of tubes of one length or another or a plurality of tubes coupled together in succession all as in the prior embodiments. Straps 66 support the housing 60 on the head of the dog 62 and a foam layer 68 around the periphery thereof is likewise provided. In the embodiment for a dog, however, the length of the housing 66 is about 2 to 3 times the average diameter of the housing 16. This compares with a length of 1 to 1½ times the average diameter in the primary embodiment. As such, housings can be from 1½ to 3 times the average housing diameter.

The above descriptions relate to apparatus for modifying the breathing capabilities of an animal, whether a horse, dog, human, etc., to thereby enhance competitive activities. Such apparatus may readily be utilized in improved training methods. More specifically, the improved training methods include first determining the lung capacity of the animal to be trained. A second determination is then made as to the percentage of re-breathed air which would be required to force increased work by the lungs of the animal during training in order to effect the intended increase in bodily capabilities and, consequently, improved competitive performance. Thereafter a properly sized mask and tubing is selected in order to effect the determined extent of re-breathing for forcing increased work by the animal in training. A training regimen in accordance with the prior determinations is established and begun. Monitoring of the animal is done periodically during training. The appropriately sized mask and tubing is then modified as the training regimen of exercise is continued and performance is improved.

Prior to any increasing of the tubing sizes which would require additional work by the animal, the animal is tested without the apparatus to determine progress prior to moving on to the next greater tubing length and level of training strenuousness. Upon reaching the desired goal of increased competitive capacity in terms of lung capacity, cardiovascular capabilities, etc., the regimen is either discontinued or recontinued periodically on a reduced basis to maintain the improvement. In this manner, carefully monitored training in accordance with the method described herein, in association with the apparatus described above, will optimize the capabilities of the animal for improving physical capacities and performance at the desired elevated level.

As an alternative to the method as described above, the increasing of work to be done by the animal's lungs may be done by other than increasing the tubing size. Specifically, essentially the same result may be attained by attaching the tubing ends to a source of modified air with reduced oxygen content and, preferably, increased nitrogen content. By then varying a valve to vary the quantity of modified air available, the work to be done by the lungs is correspondingly varied.

The present disclosure includes that contained in the appended claims as well as that of the foregoing description. Although this invention has been described in its preferred form with a certain degree of particularity, it is understood that the present disclosure of the preferred embodiment has been made by way of example only and that numerous changes in the details of construction and the combination and arrangement of parts may be restored to without departing from the spirit and scope of the invention.

Now that the invention has been described,
What is claimed is:

1. A breathing mask for use on an animal having a muzzle, said mask comprising:
   a truncated conical shaped mask body, said body having:
   a) an outer circumference;
   b) a large open end having a perimeter;
   c) a small closed end;
   d) a length and an average diameter;
   e) means for creating a clearance between said closed end and an animal's muzzle comprising said length being greater than said diameter;
   f) foam padding within the perimeter of said open end, said padding being a thick, closed cell, elastomeric material secured within the perimeter of said open end;
   g) two air ports in said mask body;
   h) fastening means attached to said outer circumference for securing said mask to an animal; and
   i) means for selectively increasing or decreasing the amount of oxygen-depleted air breathed by an animal wearing said mask comprising a pair of tubes attached to said ports, said means for selectively increasing or decreasing the amount of inhaled oxygen-depleted air comprising means to selectively change the length of said tubes from a long tube which increases the amount of re-breathed oxygen-depleted air inhaled to a shorter tube which decreases the amount of re-breathed oxygen-depleted air inhaled.

2. The apparatus set forth in claim 1 wherein the means for changing the lengths of said tubes a group of tube pairs of varying sizes, any pair of which may be coupled to the port means.

3. The breathing mask of claim 1, further comprising gas tank means supported on an animal wearing said mask, said gas tank means coupled to said ports by said pair of tubes, wherein said gas tank means supplies fresh gas through said pair of tubes to supplement said oxygen-depleted air inhaled.

* * * * *